(12) United States Patent
Ohtsuki et al.

(10) Patent No.: US 7,618,194 B2
(45) Date of Patent: Nov. 17, 2009

(54) WHEEL BEARING APPARATUS INCORPORATED WITH A WHEEL SPEED DETECTING APPARATUS

(75) Inventors: Hisashi Ohtsuki, Iwata (JP); Kazuhisa Shigeoka, Iwata (JP); Tomomi Ishikawa, Iwata (JP)

(73) Assignee: NTN Corporation (JP)

( * ) Notice: Subject to any disclaimer, the term of this patent is extended or adjusted under 35 U.S.C. 154(b) by 724 days.

(21) Appl. No.: 11/101,351

(22) Filed: Apr. 7, 2005

(65) Prior Publication Data

US 2005/0226545 A1    Oct. 13, 2005

(30) Foreign Application Priority Data

Apr. 9, 2004    (JP)    ............................. 2004-115145
Apr. 9, 2004    (JP)    ............................. 2004-115146

(51) Int. Cl.
    *F16C 13/00*    (2006.01)
    *F16C 33/80*    (2006.01)
(52) U.S. Cl. ........................................ 384/544; 384/480
(58) Field of Classification Search .................. 384/448, 384/589, 544
    See application file for complete search history.

(56) References Cited

U.S. PATENT DOCUMENTS

| | | | | |
|---|---|---|---|---|
| 4,968,156 A | * | 11/1990 | Hajzler | .......................... 384/448 |
| 5,382,098 A | * | 1/1995 | Rigaux et al. | ................ 384/448 |
| 5,611,545 A | * | 3/1997 | Nicot | ........................... 277/402 |

FOREIGN PATENT DOCUMENTS

JP    2003-254985    9/2003

JP    2003 254985 A    * 10/2003

* cited by examiner

*Primary Examiner*—Thomas R Hannon
*Assistant Examiner*—Justin Krause
(74) *Attorney, Agent, or Firm*—Harness, Dickey & Pierce, P.L.C.

(57) ABSTRACT

A wheel bearing apparatus incorporating a wheel speed detecting apparatus has an outer member (4) with an integrally formed body mounting flange (4b) and double row outer raceway surfaces (4a) formed on the inner circumferential surface of the outer member (4). An inner member (3) includes a wheel hub (1) with an integrally formed wheel mounting flange (7) at one end. A cylindrical portion (1b) axially extends from the wheel mounting flange (7). An inner ring (6) is fitted on the cylindrical portion (1b) of the wheel hub (1). Double row inner raceway surfaces (1a, 6a) are formed on the outer circumferential surfaces of the wheel hub (1) and inner ring (6), respectively opposite to the double row outer raceway surfaces (4a). Double row rolling elements (5) are rotatably arranged between the outer and inner raceway surfaces (4a; 1a, 6a). An encoder (19) is mounted on the outer circumferential surface of the inner ring (6). An annular sensor holder (15) is arranged on the end of the outer member (4) opposite to the encoder (19). A wheel speed detecting sensor (20) is integrally molded with the sensor holder (15) and arranged opposite to the encoder (19), via a predetermined radial gap. The encoder (19) has an annular ring configuration and its characteristics alternately and equidistantly vary along its circumferential direction. A seal is arranged at the inboard side of the encoder (19). The seal includes first and second annular sealing plates (21, 22) mounted on the sensor holder (15) and the inner ring (6), respectively, and opposite toward each other. The encoder (19) is mounted on the second sealing plate (22).

9 Claims, 7 Drawing Sheets

PRIOR ARTS

Fig. 8

PRIOR ARTS

WHEEL BEARING APPARATUS INCORPORATED WITH A WHEEL SPEED DETECTING APPARATUS

CROSS-REFERENCE TO RELATED APPLICATION

This application claims priority to Japanese Patent Application Nos. 2004-115145, filed Apr. 9, 2004 and 2004-115146, filed Apr. 9, 2004, which applications are herein expressly incorporated by reference.

FIELD OF THE INVENTION

The present invention relates to a vehicle wheel bearing apparatus, and more particularly, to a wheel bearing apparatus incorporating a wheel speed detecting apparatus to detect a rotation speed of the wheel.

BACKGROUND OF THE INVENTION

It is generally known that a wheel bearing apparatus can support a vehicle wheel relative to a suspension apparatus. Also, a wheel speed detecting apparatus to detect a rotation speed of the vehicle wheel and to control the anti-lock braking system (ABS) is incorporated with the wheel bearing apparatus. Such a bearing apparatus generally includes a wheel speed detecting apparatus with a magnetic encoder having magnetic poles alternately arranged along its circumferential direction. The encoder is integrated in a sealing apparatus arranged between inner and outer members to contain rolling elements (balls or rollers). Further, a wheel speed detecting sensor is included to detect the variation in the magnetic poles of the magnetic encoder according to the rotation of the wheel.

The wheel speed sensor is usually mounted on a knuckle after the wheel bearing apparatus is mounted on the knuckle to form a suspension apparatus. Recently, a wheel bearing apparatus incorporating a wheel speed detecting apparatus has been proposed. Generally, the wheel speed detecting sensor is self-contained within the wheel bearing in order to reduce the size of the wheel bearing apparatus as well as to eliminate a troublesome air gap adjustment between the wheel speed sensor and the magnetic encoder.

Figure 7:
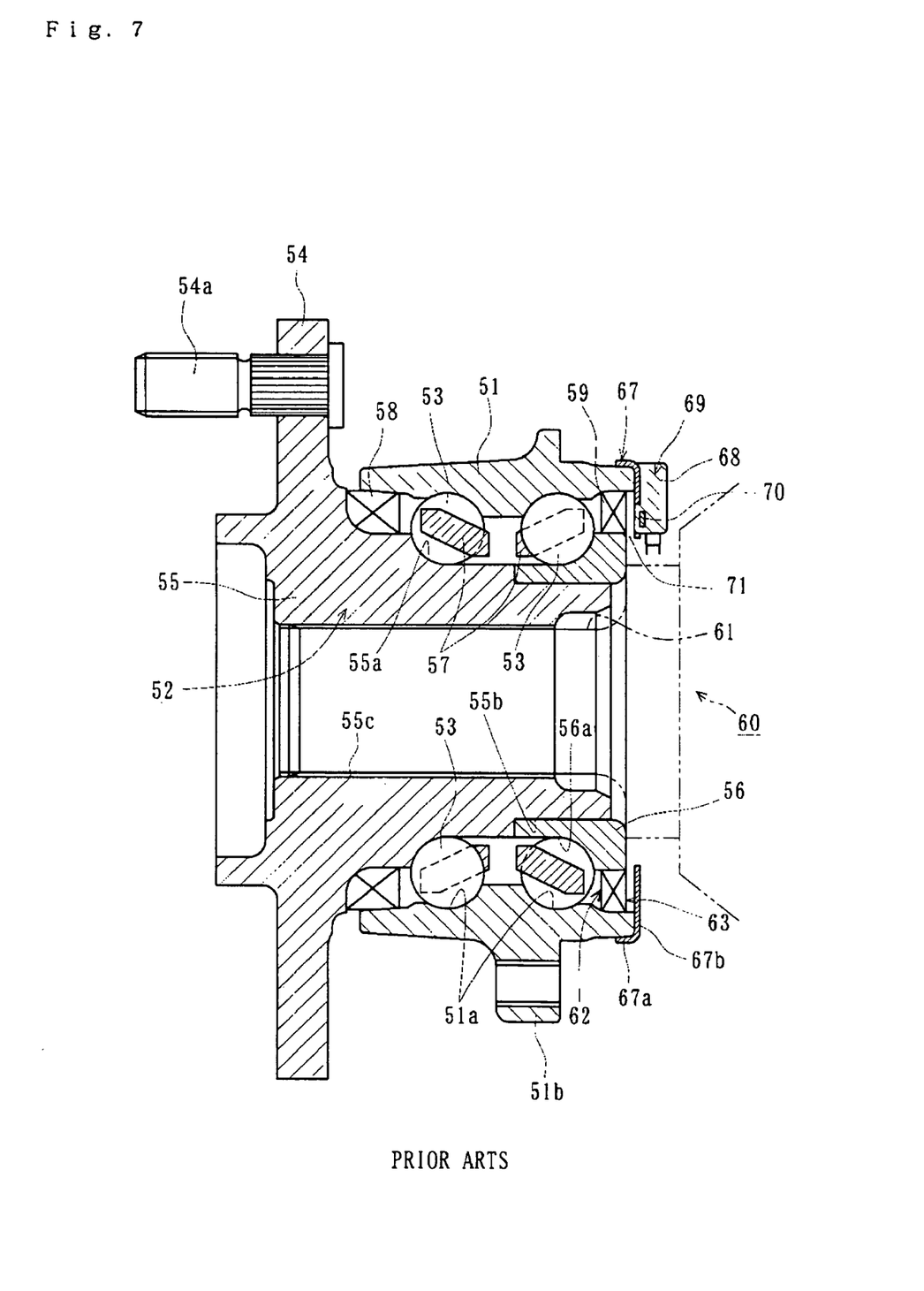
FIG. 7 is a partially enlarged longitudinal-section view of a wheel bearing apparatus of a vehicle of the prior art.

An example of a wheel bearing apparatus incorporating a wheel speed detecting apparatus is shown in Japanese Laid-open Patent Publication No. 2003-254985, as shown in FIG. 7. This wheel bearing apparatus with an incorporated wheel speed detecting apparatus has an outer member 51 which forms a stationary member secured on a suspension apparatus (not shown). A wheel hub 55 and an inner member 52, which includes the wheel hub 55 and an inner ring 56, are inserted in the outer member 51 via a double row rolling elements (balls) 53 and 53. The outer member 51 has an integral wheel mount flange 51b at one end and double row outer raceway surfaces 51a and 51a formed on its inner circumferential surface. The inner member 52 is formed with double row inner raceway surfaces 55a and 56a opposite to the double row outer raceway surfaces 51a and 51a. One (55a) of the double row inner raceway surfaces is formed on the outer circumferential surface of the wheel hub 55 and the other (56a) is formed on the outer circumferential surface of the inner ring 56. The inner ring 56 is press-fit on the cylindrical portion 55b which extends axially from the inner raceway surface 55a of the wheel hub 55. The double row rolling elements 53 and 53 are arranged between the outer and inner raceway surfaces (51a, 51a) and (55a, 56a), respectively, and rotatably held by cages 57 and 57.

The wheel hub 55 has an integrally formed wheel mount flange 54 to mount a wheel (not shown). Hub bolts 54a, to secure the wheel, are rigidly secured on the wheel mount flange 54 equidistant about its periphery. A serration 55c is formed on the inner circumferential surface of the wheel hub 55. A stem portion 61 of an outer joint member 60 is inserted into the serration 55c and forms the constant velocity universal joint (not shown). Seals 58 and 59 are arranged at both ends of the outer member 51 to prevent leakage of grease contained within the bearing as well as the ingress of rain water or dust.

Figure 8:
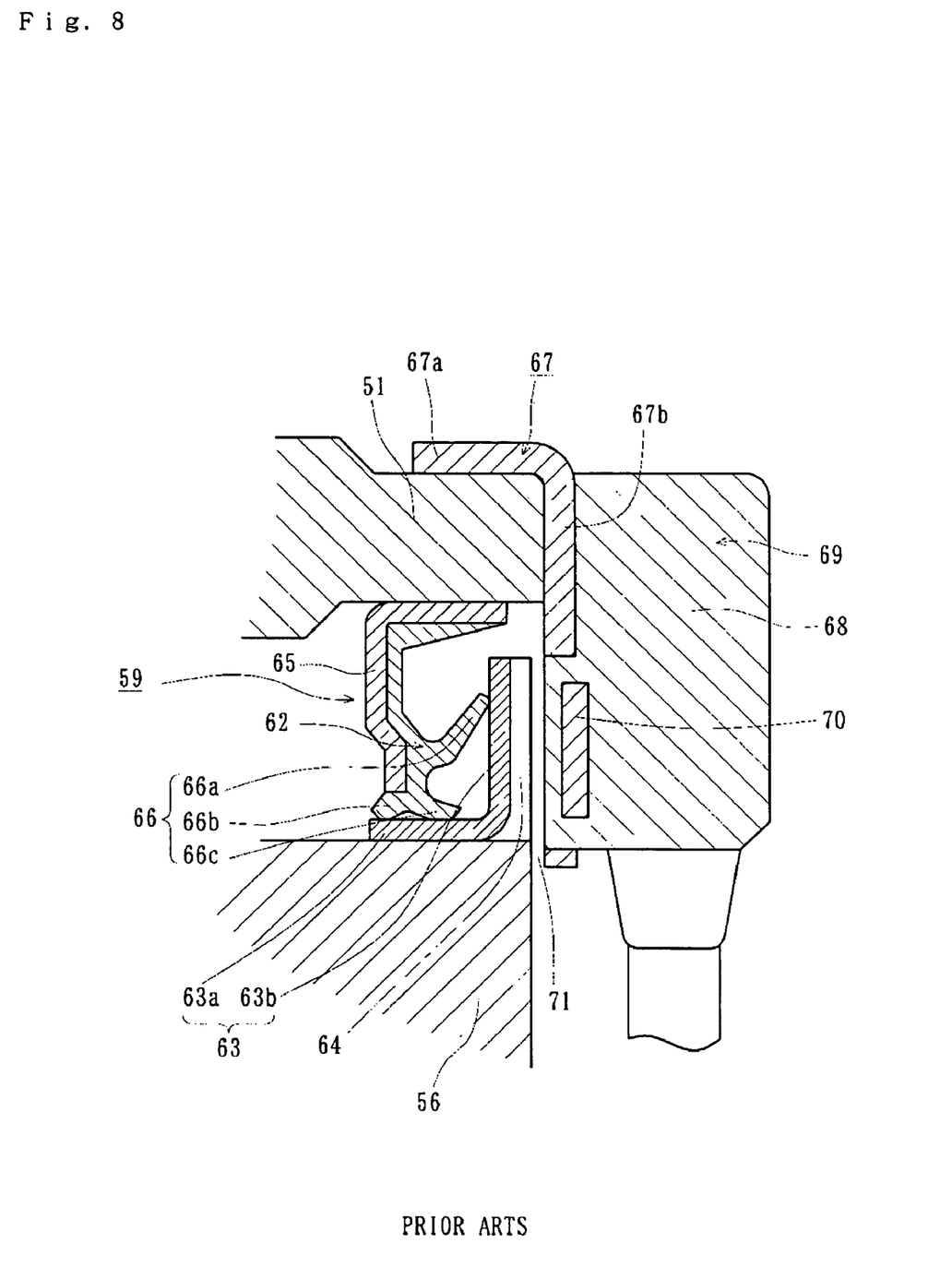
FIG. 8 is a partially enlarged longitudinal-section view of FIG. 7.

The seal 59 of the inboard side, as shown in an enlarged view of FIG. 8, is fitted in the inner circumference at the end of the outer member 51. The seal 59 has a first sealing plate 62, and a second sealing plate 63 with an "L"-shaped cross-section. The second sealing plate 63 has a cylindrical portion 63a fitted on the outer circumference of the inner ring 56. A standing portion 63b extends radially outward from the cylindrical portion 63a. A magnetic encoder 64 is adhered, via vulcanized adhesion, on the outer surface of the standing portion 63b. The magnetic encoder 64 is formed of rubberized magnet. The magnetic poles N and S are alternately arranged along the circumferential direction.

The first sealing plate 62 includes a metal core 65 with a substantially "L"-shaped cross-section. A sealing member 66, including a side lip 66a, is in sliding contact with the inner side surface of the standing portion 63b of the second sealing plate 63. A pair of radial lips 66b and 66c are in sliding contact with the cylindrical portion 63a of the second sealing plate 63.

An annular sensor holder 69 is mounted on one end of the outer member 51. The annular sensor holder 69 has a fitting cylinder 67 and a holding portion 68 connected to the fitting cylinder 67. The fitting cylinder 67 has an annular configuration with an "L"-shaped cross-section defined by a cylindrical portion 67a and a flange portion 67b which extends radially inward from the cylindrical portion 67a.

The holding portion 68 is made by molding synthetic resin to an annular body where a wheel speed sensor 70 is embedded in the resin. The wheel speed sensor 70 is arranged opposite to the magnetic encoder 64, via a predetermined air gap therebetween. The wheel speed sensor 70 includes a magnetic detecting element such as a Hall element, a magnetic resistance element (MR element) etc. which changes characteristics in accordance with the flowing direction of magnetic flux. An IC is incorporated with a waveform shaping circuit to shape the output waveform of the magnetic detecting element.

A labyrinth seal is formed by a small gap 71 arranged between the flange portion 67b of the fitting cylinder 67 and the end surface of the inner ring 56. This prevent ingress of foreign matter, such as magnetic powder, into a space between the magnetic encoder 64 and the detecting portion of the wheel speed sensor 70 from outside of the bearing apparatus. However, this occurs before the stem portion 61 of the outer joint member 60 is inserted into the wheel hub 55 which includes a course in which the bearing apparatus is transferred to an assemble line of a manufacturer of an automobile. Accordingly, the reliability of detecting the rotation speed of the wheel can be improved.

However, although the wheel bearing apparatus with the incorporated wheel speed detecting apparatus of the prior art has a superior effect mentioned above, it is impossible to prevent ingress of foreign matter, such as magnetic powder, into a space between the magnetic encoder 64 and the detecting portion of the wheel speed sensor 70 from the outside of the bearing apparatus under severe circumstances during real running of the vehicle.

SUMMARY OF THE INVENTION

It is, therefore, an object of the present invention to provide a wheel bearing apparatus incorporating a wheel speed detecting apparatus which is small in size and can prevent ingress of foreign matter into the wheel speed detecting region. Thus, the present invention improves the durability as well as the reliability of the speed detector.

According to the present invention, a wheel bearing apparatus incorporating a wheel speed detecting apparatus comprises an outer member with an integrally formed body mount flange. Double row outer raceway surfaces are formed on the inner circumferential surface of the outer member. An inner member includes a wheel hub with an integrally formed wheel mounting flange at one end. A cylindrical portion axially extends from the wheel mounting flange. An inner ring is fitted on the cylindrical portion of the wheel hub. Double row inner raceway surfaces are formed on the outer circumferential surfaces of the wheel hub and inner ring, respectively, opposite to the double row outer raceway surfaces. Double row rolling elements are rotatably arranged between the outer and inner raceway surfaces. An encoder is mounted on the outer circumferential surface of the inner ring. An annular sensor holder is arranged on the end of the outer member opposite to the encoder. A wheel speed detecting sensor is molded integrally with the sensor holder and arranged opposite to the encoder, via a predetermined radial gap. The encoder has an annular ring configuration with its characteristics varying alternately and equidistantly along the circumferential direction. A seal is arranged at the inboard side of the encoder. The seal includes a first and second annular sealing plates mounted on the sensor holder and the inner ring, respectively, and opposite toward each other. The encoder is mounted on the second sealing plate.

According to the present invention, the encoder has an annular ring configuration and its characteristics alternately and equidistantly vary along the circumferential direction. A seal is arranged at the inboard side of the encoder. The seal includes first and second annular sealing plates mounted on the sensor holder and the inner ring, respectively, and opposite toward each other. The encoder is mounted integrally on the second sealing plate. Accordingly, it is possible to prevent ingress of foreign matter, such as magnetic powder, into a space between the magnetic encoder and the detecting portion of the wheel speed sensor from outside of the bearing apparatus although before the stem portion of the outer joint member is inserted into the wheel hub including a course in which the bearing apparatus is transferred to an assemble line of a manufacturer of automobile and also under severe circumstances in real running of the vehicle. Thus it is also possible to improve the detection reliability of the wheel rotation speed.

According to the present invention, the second sealing plate is fit on the outer circumferential surface of the inner ring. The second sealing plate has a substantially "L"-shaped cross-sectional configuration formed by a cylindrical portion which has an outer circumferential surface with an integrally mounted encoder. A larger cylindrical portion extends axially from the cylindrical portion. A standing portion extends radially outward from the larger cylindrical portion. A labyrinth seal is formed at a tip area of the standing portion. The sealing ability can be improved and thus the reliability of detection of the wheel rotation speed can also be improved.

According to the present invention, a wheel bearing apparatus incorporating with a wheel speed detecting apparatus comprises an outer member with an integrally formed body mounting flange. Double row outer raceway surfaces are formed on the inner circumferential surface of the outer member. An inner member includes a wheel hub with an integrally formed wheel mounting flange at one end. A cylindrical portion axially extends from the wheel mounting flange. An inner ring is fitted on the cylindrical portion of the wheel hub. Double row inner raceway surfaces are formed on the outer circumferential surfaces of the wheel hub and inner ring, respectively, opposite to the double row outer raceway surfaces. Double row rolling elements are rotatably arranged between the outer and inner raceway surfaces. An encoder is mounted on the outer circumferential surface of the inner ring. An annular sensor holder is arranged on the end of the outer member opposite to the encoder. A sensor of wheel rotation speed is integrally molded with the sensor holder and arranged opposite to the encoder, via a predetermined axial gap. The encoder has an annular plate configuration and its characteristics alternately and equidistantly vary along its circumferential direction. A seal is arranged at the inboard side of the encoder, via the sensor holder. The seal includes first and second annular sealing plates mounted on the sensor holder and the inner ring, respectively, and opposite toward each other.

According to the present invention, the encoder has an annular plate configuration and its characteristics alternately and equidistantly vary along its circumferential direction. A seal is arranged at the inboard side of the encoder, via the sensor holder. The seal includes first and second annular sealing plates mounted on the sensor holder and the inner ring, respectively, and opposite toward each other. The detecting portions of the encoder and the wheel speed sensor can be shielded from the outside of the bearing apparatus by the sensor holder and the reliable seal. Thus, it is possible to prevent ingress of foreign matter, such as magnetic powder, into a space between the magnetic encoder and the detecting portion of the wheel speed sensor from the outside of the bearing apparatus although before the stem portion of the outer joint member is inserted into the wheel hub including a course in which the bearing apparatus is transferred to an assemble line of a manufacturer of an automobile and also under severe circumstances in real running of the vehicle. Accordingly it is also possible to improve the detection reliability of the wheel rotation speed sensor.

According to the present invention, preferably the sensor holder includes an annular fitting member manufactured from steel sheet and a holding member integrally molded with the fitting member. The fitting member includes a cylindrical fitting portion press-fitted on the outer circumferential surface of the outer member. A flange portion extends radially inward from the fitting portion and is adapted to be in close contact to the end surface of the outer member. A cylindrical portion extends axially from the flange portion. The first sealing plate is fitted in the cylindrical portion. Such an arrangement enables size reduction of the bearing apparatus in its radial dimension and simplifies the mounting structure of the sensor, and improves the workability in assembly of the wheel bearing apparatus.

According to the present invention, the bearing further comprises a shield, having a "C"-shaped cross-sectional configuration, arranged at an inboard side of the seal. The shield forms a labyrinth seal relative to the shoulder of an outer joint member. The shield is arranged to oppose the shoulder, via a small radial gap. Accordingly, the sealing ability can be further improved under real running of the vehicle.

According to the invention, the shield may be arranged to include a first cylindrical portion adapted to be fitted in the sensor holder. A standing portion extends radially inward from the first cylindrical portion. A second cylindrical portion extends axially from the standing portion. The standing portion forms a labyrinth seal relative to the second sealing plate. The standing portion is arranged to oppose the sealing plate, via a small gap. Alternatively, the shield may include a first cylindrical portion adapted to be fitted in the sensor holder. A standing portion extends radially inward from the first cylindrical portion. A second cylindrical portion extends axially from the standing portion. The second cylindrical portion forms a labyrinth seal relative to the end face of the inner ring. The second cylindrical portion is arranged to oppose the end face of the inner ring, via a small gap.

EFFECTS OF THE INVENTION

A wheel bearing apparatus incorporating a wheel speed detecting apparatus of the present invention comprises an outer member with a body and an integrally formed mount flange. Double row outer raceway surfaces are formed on the inner circumferential surface of the outer member. An inner member includes a wheel hub with an integrally formed wheel mounting flange at one end. A cylindrical portion axially extends from the wheel mounting flange. An inner ring is fitted on the cylindrical portion of the wheel hub. Double row inner raceway surfaces are formed on the outer circumferential surfaces of the wheel hub and inner ring, respectively, opposite to the double row outer raceway surfaces. Double row rolling elements are rotatably arranged between the outer and inner raceway surfaces. An encoder is mounted on the outer circumferential surface of the inner ring. An annular sensor holder is arranged on the end of the outer member opposite to the encoder. A wheel speed detecting sensor is molded integrally with the sensor holder and arranged opposite to the encoder, via a predetermined radial gap. The encoder has an annular ring configuration and its characteristics alternately and equidistantly vary along its circumferential direction. A seal is arranged at the inboard side of the encoder. The seal includes first and second annular sealing plates mounted on the sensor holder and the inner ring, respectively, and opposite toward each other. The encoder is mounted integrally on the second sealing plate. Accordingly, it is possible to prevent ingress of foreign matter, such as magnetic powder, into a space between the magnetic encoder and the detecting portion of the wheel speed sensor from the outside of the bearing apparatus although before the stem portion of the outer joint member is inserted into the wheel hub including a course in which the bearing apparatus is transferred to an assemble line of a manufacturer of automobiles and also under severe circumstances in real running of a vehicle. Thus, it is also possible to improve the detection reliability of the wheel rotation speed.

Another wheel bearing apparatus incorporating with a wheel speed detecting apparatus of the present invention comprises an outer member with an integrally formed body mounting flange. Double row outer raceway surfaces are formed on the inner circumferential surface of the outer member. An inner member includes a wheel hub with an integrally formed wheel mounting flange at one end. A cylindrical portion axially extends from the wheel mounting flange. An inner ring is fitted on the cylindrical portion of the wheel hub. Double row inner raceway surfaces are formed on the outer circumferential surfaces of the wheel hub and inner ring, respectively, opposite to the double row outer raceway surfaces. Double row rolling elements are rotatably arranged between the outer and inner raceway surfaces. An encoder is mounted on the outer circumferential surface of the inner ring. An annular sensor holder is arranged on the end of the outer member opposite to the encoder. A wheel rotation speed sensor is integrally molded with the sensor holder and arranged opposite to the encoder, via a predetermined radial gap. The encoder has an annular plate configuration and its characteristics alternately and equidistantly vary along its circumferential direction. A seal is arranged at the inboard side of the encoder via the sensor holder. The seal includes first and second annular sealing plates mounted on the sensor holder and the inner ring, respectively, and opposite toward each other. Accordingly it is possible to prevent ingress of foreign matter, such as magnetic powder, into a space between the magnetic encoder and the detecting portion of the wheel speed sensor from the outside of the bearing apparatus.

A wheel bearing apparatus incorporating with a wheel speed detecting apparatus comprises an outer member with an integrally formed body mounting flange. Double row outer raceway surfaces are formed on the inner circumferential surface of the outer member. An inner member includes a wheel hub with an integrally mounted wheel mounting flange at one end. A cylindrical portion axially extends from the wheel mounting flange. An inner ring is fitted on the cylindrical portion of the wheel hub. Double row inner raceway surfaces are formed on the outer circumferential surfaces of the wheel hub and inner ring, respectively, opposite to the double row outer raceway surfaces. Double row rolling elements are rotatably arranged between the outer and inner raceway surfaces. An encoder is mounted on the outer circumferential surface of the inner ring. An annular sensor holder is arranged on the end of the outer member opposite to the encoder. A wheel speed detecting sensor is integrally molded with the sensor holder and arranged opposite to the encoder, via a predetermined axial gap. The encoder has an annular ring configuration and is formed as a magnetic encoder. Magnetic poles, N and S of magnetic powder, are arranged along its circumferential direction. A seal is arranged at the inboard side of the encoder. The seal includes first and second annular sealing plates mounted on the sensor holder and the inner ring, respectively, and opposite toward each other. The encoder is mounted on the second sealing plate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Preferred embodiments of the present invention will be described with reference to accompanied drawings.

First Embodiment

Figure 1:
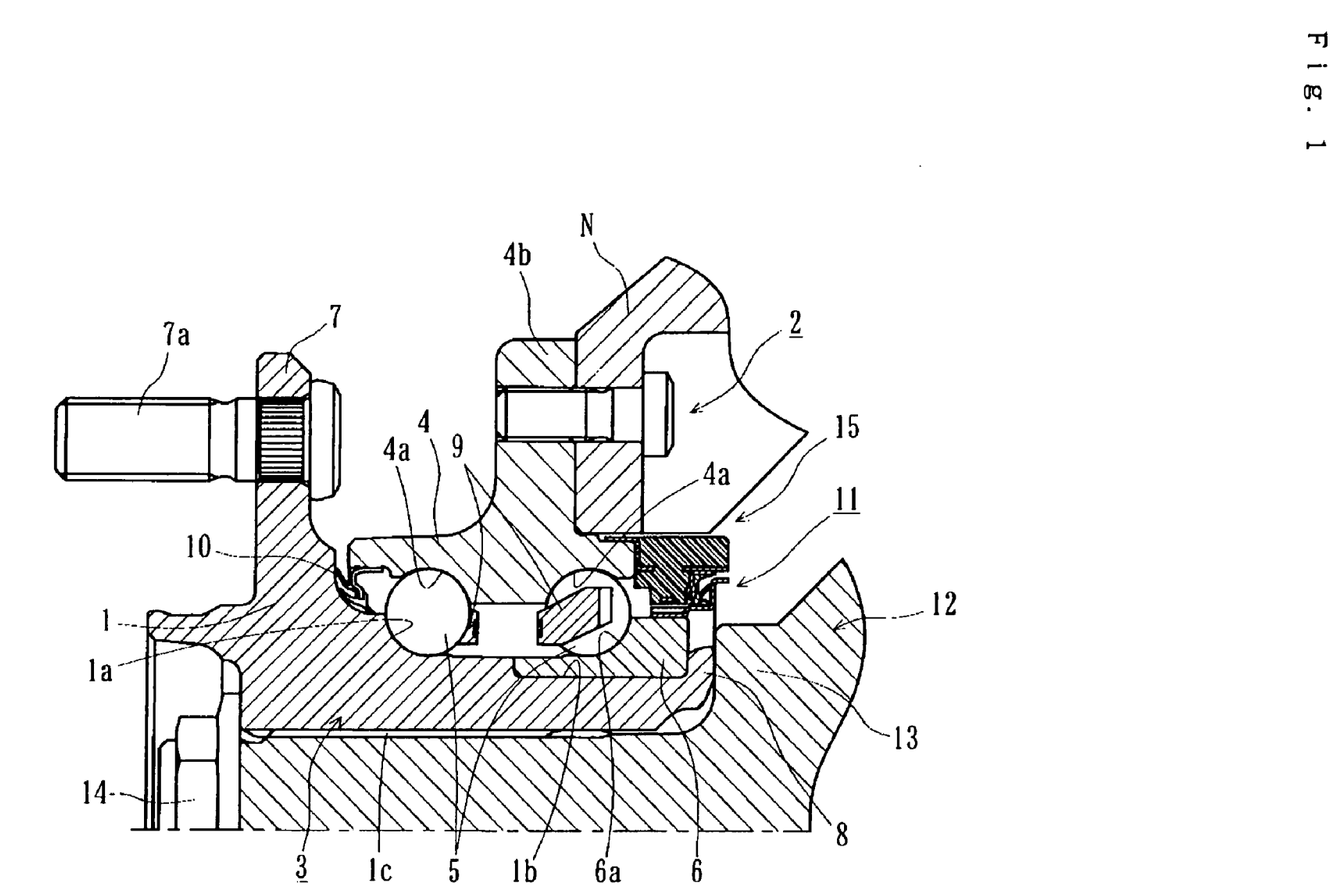
FIG. 1 is a longitudinal-section view of a first embodiment of a wheel bearing apparatus incorporating a wheel speed detecting apparatus of the present invention.
Figure 2:
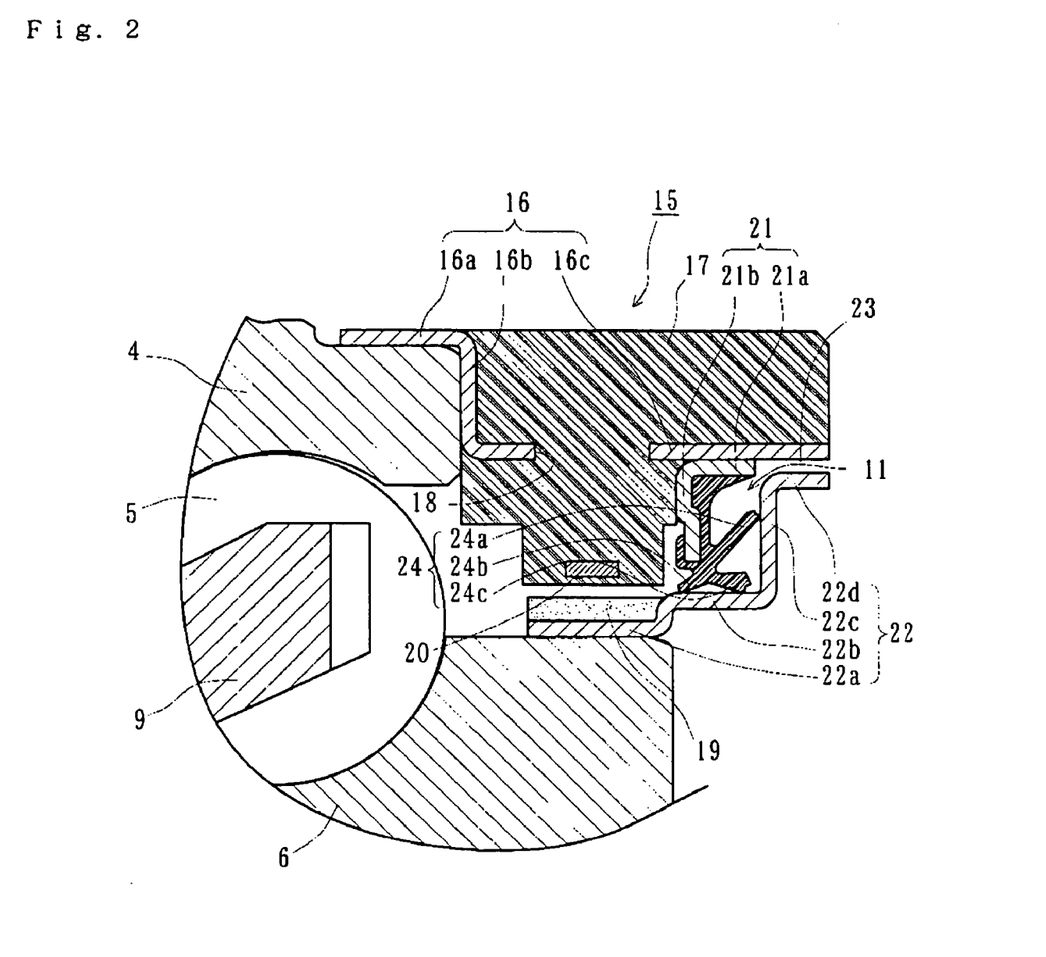
FIG. 2 is a partially enlarged longitudinal-section view of FIG. 1.

FIG. 1 is a longitudinal-section view of a first embodiment of a wheel bearing apparatus incorporating a wheel speed detecting apparatus of the present invention. FIG. 2 is a partially enlarged longitudinal-section view of FIG. 1. In the description of the present invention, an outer side of a bearing apparatus, when mounted on a vehicle, is referred to as "outboard" side (the left side in a drawing), and an inner side of a bearing apparatus, when it is mounted on a vehicle, is referred to as "inboard" side (the right side in a drawing).

The wheel bearing apparatus incorporated with a wheel speed detecting apparatus of the present invention is for a driving wheel. A wheel hub 1 and a double row rolling bearing 2 are formed as a unit arrangement and is a so-called "third generation".

The double row rolling bearing 2 includes an outer member 4, an inner member 3, and double row rolling elements (balls) 5 and 5. The outer member 4 is made of medium carbon steel such as S53C including carbon of 0.40~0.80% by weight. The outer member 4 is formed, at its outer circumferential surface, with an integral body mount flange 4b which is adapted to be mounted on a knuckle N. The outer member 4 has an inner circumferential surface with double row outer raceway surfaces 4a and 4a hardened by high frequency induction quenching to have a surface hardness of 54~64 HRC.

The wheel hub 1 is integrally formed with a wheel mounting flange 7 to mount a wheel (not shown) at its outboard end. Hub bolts 7a are secured at circumferentially equidistant positions on the mounting flange 7. The outer circumferential surface of the wheel hub 1 includes one inner raceway surface 1a corresponding to one of the double row outer raceway surfaces 4a and 4a. A cylindrical portion 1b extends axially from the inner raceway surface 1a. A caulked portion 8 is formed by plastically deforming radially outwardly the end of the cylindrical portion 1b. An inner ring 6 is press-fit onto the cylindrical portion 1b. The ring 6 is formed with the other inner raceway surface 6a corresponding to the other of the double row outer raceway surfaces 4a and 4a. The inner ring 6 is axially immovably secured relative to the wheel hub 1 by the caulked portion 8. Thus, this is a so-called self-retaining structure. Thus, it is possible to reduce the weight and size of the bearing apparatus, to improve the strength and durability of the wheel hub 1. Also, it is possible to maintain an amount on preload of the bearing apparatus for a long term since any fastening means, such as a nut, is not required to control the amount of preload of the bearing apparatus. In this description of the present invention, the inner member 3 includes the wheel hub 1 and the inner ring 6 press-fit on the wheel hub 1.

The double row rolling elements 5 and 5 are rotationally contained by cages 9 and 9 between the outer raceway surfaces 4a and 4a of the outer member 4 and the opposite arranged inner raceway surfaces 1a and 6a. Seals 10 and 11 are arranged at the ends of the outer member 4 to prevent leakage of grease contained within the bearing apparatus, as well as, ingress of rain water or dust.

The wheel hub 1 is made of medium carbon steel such as S53C including carbon of 0.40~0.80% by weight. The wheel hub 1 is formed with a hardened layer having surface hardness 54~64 HRC by high frequency induction hardening. The hardened layer extends from the seal land portion, which slidingly contacts the outboard seal 10, to the inner raceway surface 1a and cylindrical portion 1b. The caulked portion 8 is not heat treated and has a surface hardness less than 25 HRC. Thus it is possible not only to improve the wear resistance of the seal land formed at the base of the wheel mount flange 7 but to provide a sufficient mechanical strength against the rotary bending load applied to the wheel mount flange 7. Thus, this improves the durability of the wheel hub 1. In addition, it is possible to improve the workability of the caulked portion 8 during plastic deformation and to prevent generation of cracking during deformation and thus to improve the reliability and quality.

The wheel hub 1 is formed with a serration (or spline) 1c on its inner peripheral surface. An outer joint member 12, forming a constant velocity universal joint, is inserted into the serration. A shoulder 13 of the outer joint member 12 is abutted on the caulked portion 8 of the wheel hub 1 and is axially integrally secured with the wheel hub 1 by a nut 14.

As clearly shown in FIG. 2, a sensor holder 15, having an annular configuration, includes an annular fitting member 16 and a holding portion 17. The sensor holder 15 is fitted on the end of the outer member 4. The annular fitting member 16 is formed wholly as an annular body and includes a cylindrical fitting portion 16a press-fit on the outer circumferential surface of the outer member 4. A flange portion 16b extends radially inward from the fitting portion 16a. The flange portion 16b is adapted to be in close contact on the end surface of the outer member 4. A cylindrical portion 16c extends axially from the flange portion 16b. The annular fitting member 16 is stamped from stainless steel to have corrosion resistance. The holding portion 17 is molded integrally with the annular fitting member 16. Several apertures 18 are provided on the cylindrical portion 16c to retain the holding portion 17. The seal 11 is arranged at the inboard side of the sensor holder 15.

A wheel speed detecting sensor 20 is embedded within the holding portion 17. The sensor 20 is arranged opposite to a magnetic encoder 19 via a predetermined radial gap. The wheel speed sensor 20 includes a magnetic detecting element such as a Hall element, a magnetic resistance element (MR element) etc. for changing the characteristics in accordance with the flowing direction of magnetic flux. An IC is incorporated with a waveform shaping circuit to shape the output waveform of the magnetic detecting element.

The inboard seal 11 has first and second annular sealing plates 21 and 22. Each plate has a substantially "L"-shaped cross-sectional configuration and is mounted, respectively, on the sensor holder 15 and the inner ring 6 arranged opposite toward each other. The second sealing plate 22 includes a cylindrical portion 22a fitted on the inner ring 6. A larger cylindrical portion 22b extends axially from the cylindrical portion 22a. A standing portion 22c extends radially outward from the larger cylindrical portion 22b. An annular tongue 22d extends axially from the tip of the standing portion 22c and forms a labyrinth seal 23 opposing the cylindrical portion 16c of the sensor holder 15, via a small radial gap. The second sealing plate 22 is stamped from austenitic stainless steel sheet (JIS SUS 304 etc.) or cold rolled sheet (JIS SPCC etc.).

The first sealing plate 21 includes a cylindrical portion 21a fitted in the sensor holder 15. A standing portion 21b extends radially inward from one end of the cylindrical portion 21a. A sealing member 24, having a side lip 24, grease lip 24b and a medium lip 24c made of elastic material such as rubber etc., is adhered to the sealing plate 21 via vulcanized adhesion.

The side lip 24a slidably contacts with the standing portion 22c of the second sealing plate 22. The grease lip 24b and medium lip 24c slidably contact the larger cylindrical portion 22b of the second sealing plate 22. A magnetic encoder 19 is adhered, via vulcanized adhesion, on the outer surface of the cylindrical portion 22a. The magnetic encoder 19 is formed of elastomer such as rubber etc. with mingled or mixed magnetic powder. The magnetic encoder 19 has N and S poles alternately arranged along its circumferential direction and forms a rotary encoder to detect the wheel rotation speed.

As can be seen from the description of the first embodiment of the present invention, the wheel speed sensor 20 is arranged within the sensor holder 15. The seal 11 is arranged at the inboard side of the wheel speed sensor 20. In addition, the labyrinth seal 23 is formed at the inboard side of the seal 11. Thus, it is possible to prevent ingress of foreign matter, such as magnetic powder, into a space between the magnetic encoder 19 and the wheel speed sensor 20 from the outside of the bearing apparatus although before the outer joint member 12 is inserted into the wheel hub 1 including a course in which the bearing apparatus is transferred to an assemble line of a manufacturer of automobiles and also under severe circumstances in real running of a vehicle. Accordingly it is also possible to improve the reliability of detection of the wheel rotation speed. In addition, it is possible to reduce the radial dimension of the wheel bearing apparatus, simplify the mounting structure of the sensor 20, and improve the workability in assembly of the wheel bearing apparatus.

Although it is exemplary shown in this embodiment that the wheel rotation speed sensor 20 includes the magnetic encoder 19 and the magnetic detecting element, such as Hall effect element, the wheel speed detecting apparatus is not limited to such a structure. The wheel speed detecting apparatus may be a passive type apparatus including a magnetic encoder, magnets, and annular coils etc.

Figure 3:
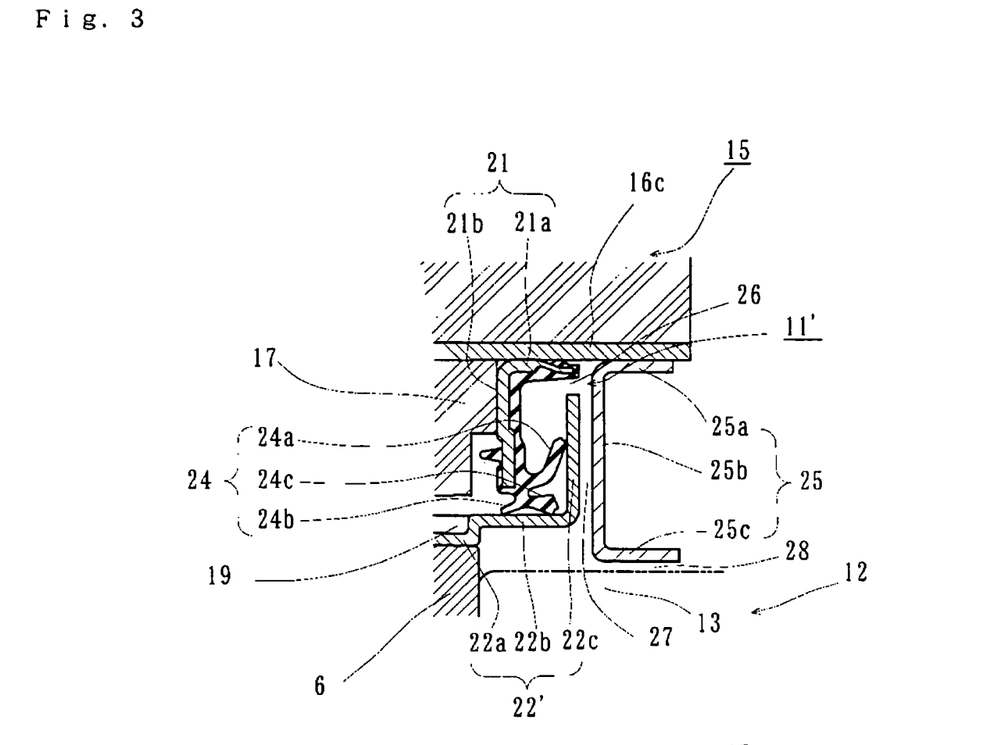
FIG. 3 is a partially enlarged longitudinal-section view of a second embodiment of a wheel bearing apparatus incorporating a wheel speed detecting apparatus of the present invention.

FIG. 3 is an enlarged view showing a second embodiment of the wheel bearing apparatus incorporating a wheel speed detecting apparatus of the present invention. This second embodiment is different from the first embodiment only in the structure of labyrinth seal. Accordingly, the same reference numerals are used in the second embodiment for designating same parts having same functions of parts as those used in the first embodiment.

The inboard seal 11' includes first and second annular sealing plates 21 and 22'. Each sealing plate has a substantially "L"-shaped cross-sectional configuration mounted, respectively, on the sensor holder 31 and the inner ring 6 and are arranged opposite toward each other. The second sealing plate 22' comprises cylindrical portion 22a fitted on the inner ring 6. A larger cylindrical portion 22b extends axially from the cylindrical portion 22a. A standing portion 22c extends radially outward from the larger cylindrical portion 22b. The tip end of the standing portion 22c opposes the cylindrical portion 21a of the first sealing plate 21, via a small radial gap, to form a labyrinth seal 26.

Further in this embodiment, a shield 25 is additionally arranged at the inboard side of the seal 11'. The shield 25 includes a first cylindrical portion 25a adapted to be fit in the sensor holder 15. A standing portion 25b extends radially inward from the first cylindrical portion 25a. A second cylindrical portion 25c extends axially from the standing portion 25b. The shield 25 has a substantially "C"-shaped cross-sectional configuration. The standing portion 25b and the standing portion 22c of the second sealing plate 22' oppose each other via a small axial gap to form a labyrinth seal 27. In addition, the second cylindrical portion 25c of the shield 25 and the shoulder 13 of the outer joint member 12 oppose each other, via a small radial gap, to form a labyrinth seal 28.

As can be clearly understood, according to this second embodiment, the shield 25 is arranged at the inboard side of the seal 11'. The labyrinth seal 27, between the seal 11' and the shield 25, and the labyrinth seal 28 are formed in addition to the labyrinth seal 26. Thus, it is possible to prevent ingress of foreign matter such as magnetic powder into a space between the magnetic encoder 19 and the wheel speed sensor 20 from the outside of the bearing apparatus although before the outer joint member 12 is inserted into the wheel hub 1 including a course in which the bearing apparatus is transferred to an assemble line of a manufacturer of automobiles and also under severe circumstances in real running of a vehicle.

Figure 4:
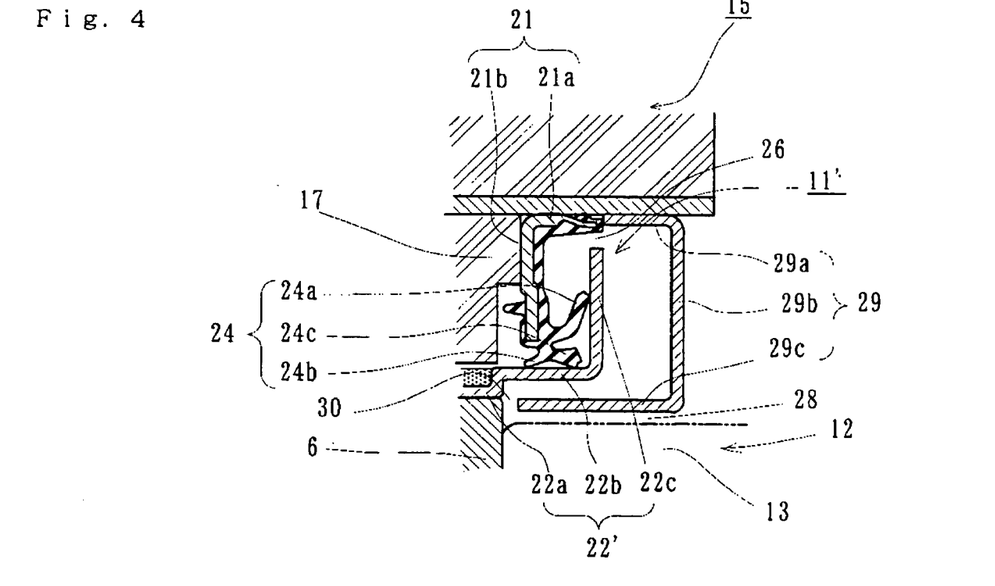
FIG. 4 is a partially enlarged longitudinal-section view of a third embodiment of a wheel bearing apparatus incorporating a wheel speed detecting apparatus of the present invention.

FIG. 4 is an enlarged view showing a third embodiment of the wheel bearing apparatus incorporating a wheel speed detecting apparatus of the present invention. This third embodiment is a modification of the second embodiment (FIG. 3) and is different from it only in the configuration of the shield. The same reference numerals are used in the third embodiment for designating the same parts having the same functions of parts as those used in the previous embodiments.

In this embodiment, a shield 29 is additionally arranged at the inboard side of the seal 11'. The shield 29 includes a first cylindrical portion 29a adapted to be fitted in the sensor holder 15. A standing portion 29b extends radially inward from the first cylindrical portion 29a. A second cylindrical portion 29c extends axially from the standing portion 29b. The shield 29 has a substantially "C"-shaped cross-sectional configuration. The second cylindrical portion 29c and the shoulder 13 of the outer joint member 12 and the end surface of the inner ring 6 oppose each other, via a small radial and axial gap, to form labyrinth seals 28 and 30, respectively.

As can be clearly understood, according to this third embodiment, the shield 29 is arranged at the inboard side of the seal 11'. Labyrinth seals 28 and 30 are formed between the shield 29 and the shoulder 13 of the outer joint member 12 and the end surface of the inner ring 6 in addition to the labyrinth seal 26. Thus, it is possible to prevent ingress of foreign matter, such as magnetic powder, into a space between the magnetic encoder 19 and the wheel speed sensor 20 from the outside of the bearing apparatus although before the outer joint member 12 is inserted into the wheel hub 1 including a course in which the bearing apparatus is transferred to an assemble line of a manufacturer of automobile and also under severe circumstances in real running of a vehicle.

Figure 5:
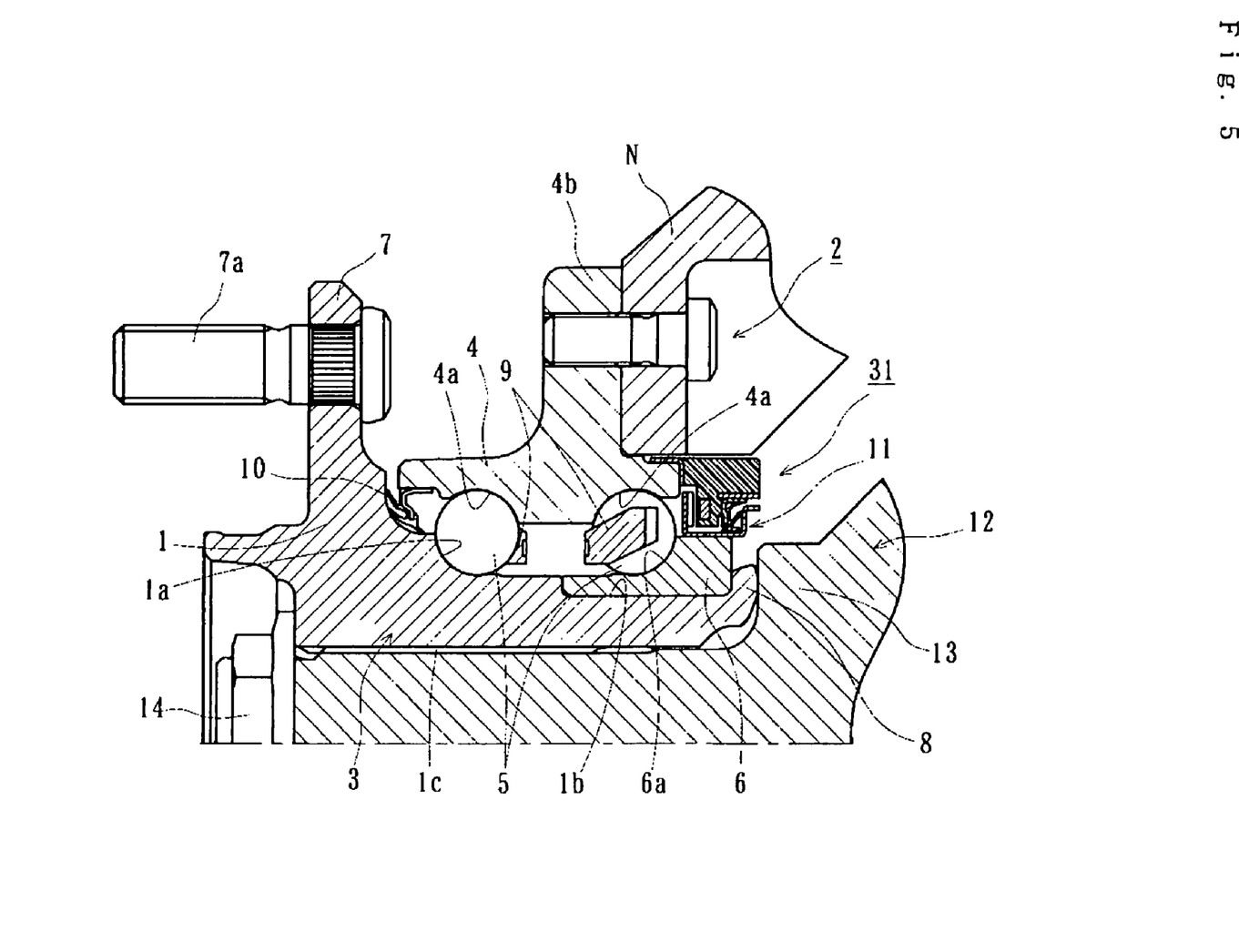
FIG. 5 is a longitudinal-section view of a fourth embodiment of a wheel bearing apparatus incorporating a wheel speed detecting apparatus of the present invention.
Figure 6:
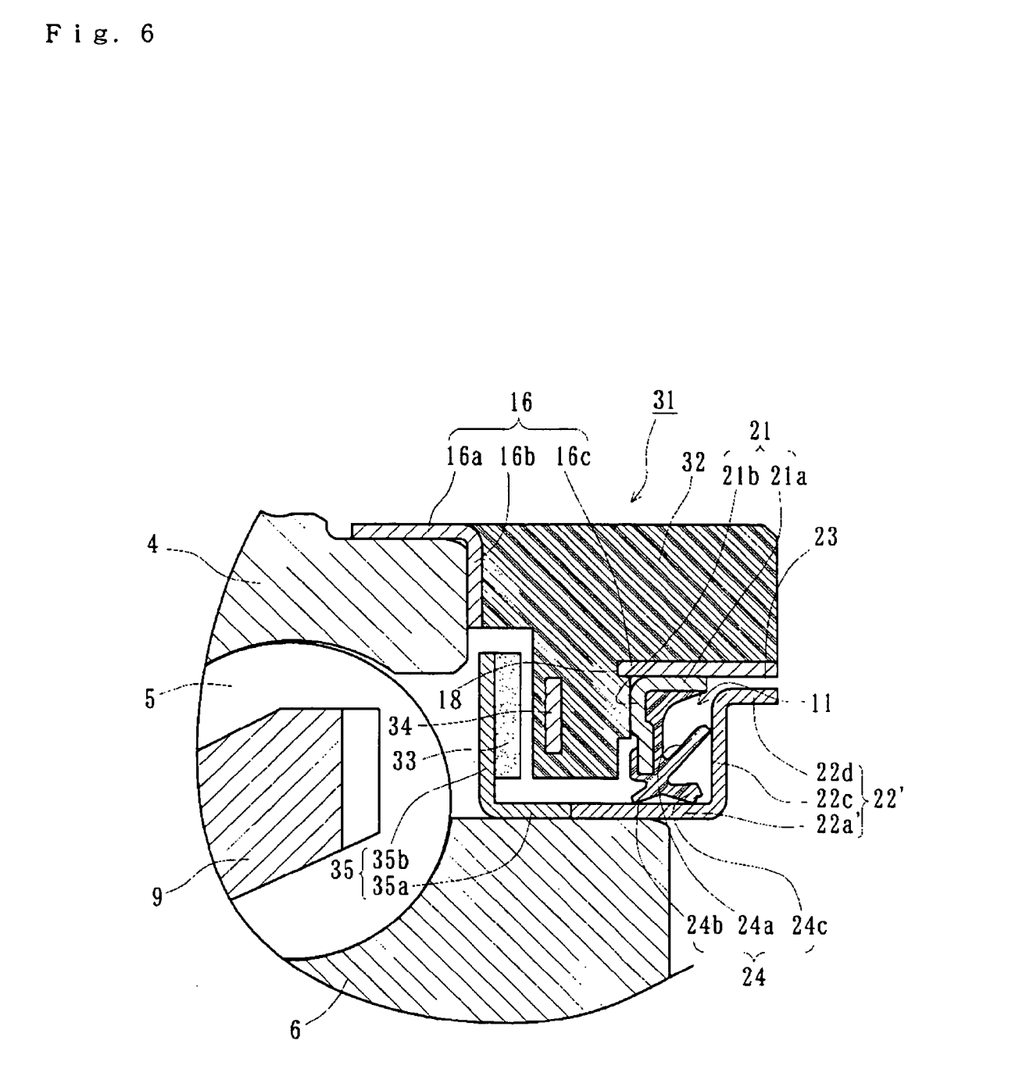
FIG. 6 is a partially enlarged longitudinal-section view of FIG. 5.

FIG. 5 is a longitudinal-section view of a fourth embodiment of a wheel bearing apparatus incorporating a wheel speed detecting apparatus of the present invention. FIG. 6 is a partially enlarged longitudinal-section view of FIG. 5. The fourth embodiment is different from the first embodiment (FIGS. 1 and 2) only in the arrangement of the detecting portion and sensor holder. The same reference numerals are used in the fourth embodiment to designate the same parts having the same functions of parts as those used in the previous embodiments.

The wheel bearing apparatus incorporating a wheel speed detecting apparatus of this embodiment is a so-called "third generation" where a wheel hub 1 and a double row rolling bearing 2 are formed as a unit arrangement.

The double row rolling bearing 2 includes an outer member 4, an inner member 3, and double row rolling elements (balls) 5 and 5. The outer member 4, at its outer circumferential surface, is integrally formed with a body mount flange 4b adapted to be mounted on a knuckle N. Its inner circumferential surface is formed with double row outer raceway surfaces 4a and 4a.

The wheel hub 1 is integrally formed with a wheel mounting flange 7 at its outboard end. The outer circumferential surface of the wheel hub 1 is formed with one inner raceway surface 1a corresponding to one of the double row outer raceway surfaces 4a and 4a. A cylindrical portion 1b extends axially from the inner raceway surface 1a. The caulked portion 8 is formed by plastically deforming radially outwardly the end of the cylindrical portion 1b. The inner ring 6 is press-fit onto the cylindrical portion 1b and formed with the other inner raceway surface 6a corresponding to the other of the double row outer raceway surfaces 4a and 4a.

The double row rolling elements 5 and 5 are rotatably contained by cages 9 between the outer raceway surfaces 4a and 4a of the outer member 4 and the opposed inner raceway surfaces 1a and 6a of the inner member 3. Seals 10 and 11 are arranged at the ends of the outer member 4 to prevent leakage of grease contained within the bearing apparatus as well as ingress of rain water or dusts.

In this fourth embodiment, the sensor holder 31 is mounted on the end of the inboard side of the outer member 4. As clearly shown in FIG. 6, the sensor holder 31 has an annular configuration which includes an annular fitting member 16 and a holding portion 32 connected to the annular fitting member 16. The annular fitting member 16 is formed wholly as an annular body and includes a cylindrical fitting portion 16a press-fit on the outer circumferential surface of the outer member 4. A flange portion 16b extends radially inward from the fitting portion 16a. A cylindrical portion 16c extends axially from the flange portion 16b. The annular fitting member 16 is stamped from stainless steel which has corrosion resistance. The holding portion 32 is integrally molded with the annular fitting member 16 by providing several apertures 18 on the cylindrical portion 16c. The seal 11 is fitted in the cylindrical portion 16c and the sensor holder 31 is securely press-fit on the end of the outer member 4 with the flange portion in close contact with the outer member 4.

A wheel speed detecting sensor 34 is embedded within the holding portion 32 and is arranged opposite to a magnetic encoder 33, via a predetermined radial gap. The wheel speed sensor 34 includes a magnetic detecting element such as a Hall element, a magnetic resistance element (MR element) etc. to change characteristics in accordance with the flowing direction of magnetic flux. An IC is incorporated with a waveform shaping circuit to shape the output waveform of the magnetic detecting element.

The inboard seal 11 includes first and second annular sealing plates 21 and 22'. Each plate has a substantially "L"-shaped cross-sectional configuration and are mounted, respectively, on the sensor holder 31 and the inner ring 6 and are arranged opposite toward each other. The second sealing plate 22' includes a cylindrical portion 22a' fitted on the inner ring 6. A standing portion 22c extends radially outward from the cylindrical portion 22a'. An annular tongue 22c extends axially from the tip of the standing portion 22c. The second sealing plate 22' is made by stamping austenitic stainless steel sheet (JIS SUS 304 etc.) or cold rolled sheet (JIS SPCC etc.).

The side lip 24a of the first sealing plate 21 slidably contacts the standing portion 22c of the second sealing plate 22'. The grease lip 24b and medium lip 24c slidably contact the cylindrical portion 22a' of the second sealing plate 22'.

A base 35, of a steel sheet, is arranged at the opposite side of the seal 11 with respect to the holding portion 32 of the sensor holder 31. The base 35 has a cylindrical portion 35a fitted on the inner ring 6. A standing portion 35b extends radially from the cylindrical portion 35a. The base 35 has a substantially "L"-shaped cross-section. A magnetic encoder 33 is adhered, via vulcanized adhesion, on the inboard surface of the standing portion 35b. The magnetic encoder 33 is formed of elastomer such as rubber etc. with mingled or mixed magnetic powder. The magnetic encoder 33 has N and S poles alternately arranged along its circumference direction and forms a rotary encoder to detect the wheel rotation speed.

As can be seen from the description of the fourth embodiment of the present invention, the wheel speed sensor 34 is arranged within the sensor holder 31. The seal 11 is arranged at the inboard side of the wheel speed sensor 34. In addition, the labyrinth seal 23 is formed at the inboard side of the seal 11. Thus, it is possible to prevent ingress of foreign matter, such as magnetic powder, into a space between the magnetic encoder 33 and the wheel speed sensor 34 from the outside of the bearing apparatus although before the outer joint member 12 is inserted into the wheel hub 1 including a course in which the bearing apparatus is transferred to an assemble line of a manufacturer of automobile and also under severe circumstances in real running of a vehicle. Accordingly it is also possible to improve the reliability of the detection of the wheel rotation speed. In addition, it is possible to reduce the radial dimension of the wheel bearing apparatus, simplify the mounting structure of the sensor 34, and improve the workability in assembly of the wheel bearing apparatus.

The present invention has been described with reference to the preferred embodiment. Obviously, modifications and alternations will occur to those of ordinary skill in the art upon reading and understanding the preceding detailed description. It is intended that the present invention be construed as including all such alternations and modifications insofar as they come within the scope of the appended claims or their equivalents.

What is claimed is:

1. A wheel bearing apparatus incorporating a wheel speed detecting apparatus comprising an outer member having an integrally formed body mount flange and double row outer raceway surfaces formed on the inner circumferential surface of the outer member;

an inner member including a wheel hub having an integrally formed wheel mounting flange at one end and a cylindrical portion axially extending from the wheel mounting flange and an inner ring fitted on the cylindrical portion of the wheel hub, double row inner raceway surfaces being formed on the outer circumferential surfaces of the wheel hub and inner ring, respectively, opposite to the double row outer raceway surfaces;

double row rolling elements rotatably arranged between the outer and inner raceway surfaces;

an encoder mounted on the outer circumferential surface of the inner ring;

an annular sensor holder arranged on the end of the outer member opposite to the encoder;

a sensor of wheel rotation speed integrally molded with the sensor holder and arranged opposite to the encoder via a predetermined axial gap;

the encoder has an annular plate configuration and its characteristics alternately and equidistantly vary along its circumferential direction;

a seal is arranged at the inboard side of the encoder via the sensor holder, the seal including first and second annular sealing plates, said first annular sealing plate fitted on the sensor holder and said second annular sealing plate fitted on the inner ring, respectively, and opposite toward each other and a sealing member sealing between said first and second annular plates; and an inboard end surface of the outer member is further outboard than an inboard end surface of the inner ring.

2. A wheel bearing apparatus incorporating a wheel speed detecting apparatus according to claim 1, wherein the sensor holder includes an annular fitting member manufactured from a steel sheet and a holding member, the fitting member including a cylindrical fitting portion press-fit on the outer circumferential surface of the outer member, a flange portion extending radially inward from the fitting portion and adapted to be in close contact on the end surface of the outer member, and a cylindrical portion extending axially from the flange portion, and the first sealing plate being fitted in the cylindrical portion.

3. A wheel bearing apparatus incorporating with a wheel speed detecting apparatus according to claim 1, further comprising a shield having a "C"-shaped cross-sectional configuration arranged at inboard side of the seal, the shield forming a labyrinth seal relative to a shoulder of an outer joint member and arranging the shield to be opposed to the shoulder via a small radial gap.

4. A wheel bearing apparatus incorporating a wheel speed detecting apparatus comprising:

an outer member having an integrally formed body mounting flange and double row outer raceway surfaces formed on the inner circumferential surface of the outer member;

an inner member including a wheel hub having an integrally formed wheel mounting flange at one end and a cylindrical portion axially extending from the wheel mount flange and an inner ring fitted on the cylindrical portion of the wheel hub, double row inner raceway surfaces being formed on the outer circumferential surfaces of the wheel hub and inner ring, respectively, opposite to the double row outer raceway surfaces;

double row rolling elements rotatably arranged between the outer and inner raceway surfaces;

an encoder mounted on the outer circumferential surface of the inner ring;

an annular sensor holder arranged on the end of the outer member opposite to the encoder;

a wheel speed detecting sensor integrally molded with the sensor holder and arranged opposite to the encoder via a predetermined radial gap;

the encoder has an annular ring configuration and its characteristics alternately and equidistantly vary along its circumferential direction;

a seal is arranged at the inboard side of the encoder, the seal including a sealing member, first and second annular sealing plates, said first annular sealing plate fitted in the sensor holder and said second annular sealing plate fitted on the inner ring, respectively, and opposite toward each other, said sealing member sealing between said first and second annular plates;

an inboard end surface of the outer member is further outboard than an inboard end surface of the inner ring; and the encoder is integrally mounted on the second sealing plate.

5. A wheel bearing apparatus incorporating a wheel speed detecting apparatus of claim 4, wherein the second sealing plate is fitted on the outer circumferential surface of the inner ring, said second sealing plate has a substantially "L"-shaped cross-sectional configuration formed by a cylindrical portion with an outer circumferential surface being integrally mounted with the encoder, a first leg of the L of the cylindrical portion extending axially along the inner ring, and a second leg of the L of the cylindrical portion extending radially outward from the first leg of the L of the cylindrical portion, and a labyrinth seal being formed at a tip area of the second leg of the L of the cylinder portion.

6. A wheel bearing apparatus incorporating a wheel speed detecting apparatus according to claim 4, wherein the sensor holder includes an annular fitting member manufactured from a steel sheet and a holding member, the fitting member including a cylindrical fitting portion press-fit on the outer circumferential surface of the outer member, a flange portion extending radially inward from the fitting portion and adapted to be in close contact on the end surface of the outer member, and a cylindrical portion extending axially from the flange portion, and the first sealing plate being fitted in the cylindrical portion.

7. A wheel bearing apparatus incorporating with a wheel speed detecting apparatus according to claim 4, further comprising a shield having a "C"-shaped cross-sectional configuration arranged at inboard side of the seal, the shield forming a labyrinth seal relative to a shoulder of an outer joint member and arranging the shield to be opposed to the shoulder via a small radial gap.

8. A wheel bearing apparatus incorporating a wheel speed detecting apparatus of claim 7, wherein the shield includes a first cylindrical portion adapted to be fitted in the sensor holder, a standing portion extending radially inward from the first cylindrical portion and a second cylindrical portion extending axially from the standing portion, the standing portion forming a labyrinth seal relative to the second sealing plate and arranging the standing portion to oppose the sealing plate via a small gap.

9. A wheel bearing apparatus incorporating a wheel speed detecting apparatus of claim 7, wherein the shield includes a first cylindrical portion adapted to be fitted in the sensor holder, a standing portion extending radially inward from the first cylindrical portion and a second cylindrical portion extending axially from the standing portion, the second cylindrical portion forming a labyrinth seal relative to the end face of the inner ring and arranging the second cylindrical portion to be opposed to the end face of the inner ring via a small gap.

* * * * *

UNITED STATES PATENT AND TRADEMARK OFFICE
CERTIFICATE OF CORRECTION

PATENT NO. : 7,618,194 B2
APPLICATION NO. : 11/101351
DATED : November 17, 2009
INVENTOR(S) : Ohtsuki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1081 days.

Signed and Sealed this

Nineteenth Day of October, 2010

David J. Kappos
*Director of the United States Patent and Trademark Office*